Sept. 17, 1957   E. P. TURSE ET AL   2,806,292
VISUAL INDICATING MICROMETER
Filed July 6, 1954

EMANUEL P. TURSE
RICHARD T. HUKILL
        INVENTORS.

BY
        ATTORNEY 2,806,292

Patented Sept. 17, 1957

2,806,292

VISUAL INDICATING MICROMETER

Emanuel P. Turse, China Lake, and Richard T. Hukill, Port Hueneme, Calif.

Application July 6, 1954, Serial No. 441,264

11 Claims. (Cl. 33—164)

The present invention relates to an improvement in tools such as micrometers and the like, for the purpose of making it possible for unskilled technicians to make more accurate measurements with the tool. In particular, the invention involves an improvement wherein an electrical circuit is completed to a signaling device such as a bulb or lamp, when the work is engaged by the tool. Thus, an exactly reproduceable feel may be taken of the work each time a measurement is made, the engagement of the work being indicated when the signal lamp is energized so that unskilled workmen or technicians are enabled to make accurate measurements.

The invention finds a preferred application in connection with micrometers of all sizes, but it may be adapted in other tools such as inside calipers, etc.

It is known in the art that a machinist must have considerable experience in order to take measurements accurate to .001". To take measurements to a greater accuracy than this, say to .0001", requires the highest degree of experience, and even then such measurements are not dependable. With the present invention, measurements can be taken accurately and dependably to .0001", and this is possible even with unskilled personnel. It follows, therefore, that the invention makes it possible to use personnel with considerably less training and skill in connection with precision work where technicians with a high degree of training were otherwise required. These personnel, utilizing the present invention, can be depended upon with less supervision, and economies can be effected through avoidance of spoilage of work resulting from inaccurate measurements.

An object of the invention is, accordingly, to provide an improvement in micrometers or the like by providing for a signal to be given when the work is engaged by the micrometer or other tool.

Another object of the invention is to provide an improvement in a micrometer or the like, wherein the spindle of the micrometer forms an electrical contact and energizes the signaling device when the work is engaged.

Another object of the invention is to provide an improvement in the foregoing, involving a micrometer spindle, the spindle having an insulated electrical contact at its end and carrying a battery and signal lamp or bulb adapted to be energized when the contact point engages the work being measured.

Another object of the invention is to provide a spindle as in the foregoing, as part of an assembly including a thimble.

The invention contemplates that it may be embodied in a spindle adapted to be substituted for spindles in existing micrometers, so that the invention may be practiced in micrometers or other like tools now in existence. The invention may be embodied in a micrometer spindle which is part of an assembly or component including a thimble, the assembly being one which can be substituted for the corresponding assembly in existing micrometers.

Further objects and numerous of the advantages of the invention will become apparent from the following detailed description and annexed drawings, wherein.

Figure 1:
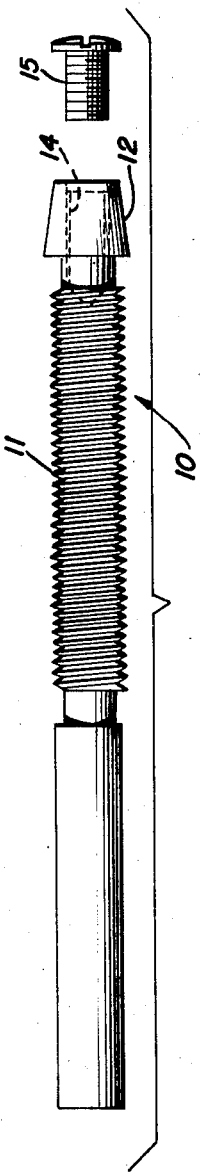
Fig. 1 is a view of a prior art spindle assembly of existing micrometers.

Referring now to the drawings, a prior art spindle is indicated at 10, the spindle being cylindrical as shown, having a screw-threaded portion 11 and a tapered or conical portion 12 at its end. At this same end it has a tapped hole 14 adapted to receive a screw 15. In the conventional prior art spindle a thimble fits over the screw-threaded portion 11, the thimble having a tapered recess adapted to fit over the tapered portion 12 of the spindle, the thimble being held in place by the screw 15.

It will be understood, of course, in connection with the foregoing, that the spindle engages within the barrel of the micrometer, and the thimble fits around the outside of the barrel, and the end of the thimble carries graduations movable adjacent a scale on the barrel of the micrometer.

Figure 2:
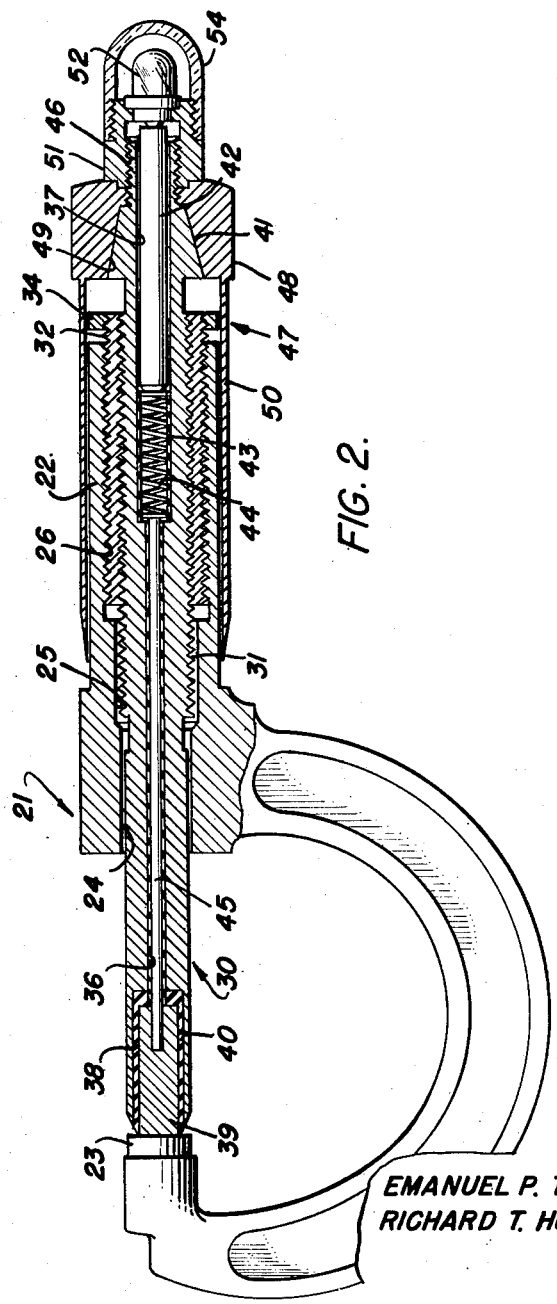
Fig. 2 is a cross-sectional view of a micrometer having the spindle of our invention incorporated therein.

Referring now to Fig. 2 of the drawings, this figure shows a spindle modified in accordance with our invention and mounted within a micrometer. In Fig. 2 the micrometer frame is shown at 21, the micrometer having a barrel 22 and an anvil 23. It has a bore 24, a counterbore 25, and also a screw-threaded counterbore 26. The improved spindle of my invention is designated at 30 and its screw-threaded portion 31 engages within a screw-threaded sleeve 32 which is within the screw-threaded counterbore 26 of the micrometer. The sleeve 32 has a nut 34 at its end, for locking it in the barrel 22 of the micrometer, after zero adjustment has been made.

The spindle 30 has a central bore 36 and a counterbore 37 at one end, and a counterbore 38 at the other end. In the counterbore 38 is an insert 39 comprising a hardened contact member which forms an electrical contact. The member 39 is fitted within insulating material 40 which spaces the member from the spindle itself. In the counterbore 37 is a battery 42 of the type used in small pencil-type flashlights. Within one end of the bore 37 there is an insulating sleeve 43 and inside of the sleeve is a coil spring 44 which engages the end of the battery 42. The other end of the spring is connected by an insulated electrical conductor 45 to the contact member 39. Near its end the spindle 30 has a tapered or conical portion 41, and extending therefrom is a screw-threaded nipple 46. Numeral 47 designates a thimble having a portion 48 which forms a rotating knob and it has a central tapered recess 49 which fits over the tapered portion 41 of spindle 30, the nipple 46 extending through the end of the thimble 47. The thimble has an extending skirt or sleeve 50 which surrounds the barrel 22 of the micrometer. Numeral 51 designates a fitting which engages the nipple 46 of the spindle 30 and bears against the knob portion of the thimble 47. The fitting 51 has an internally formed seat or socket for a miniature electric bulb or lamp 52 which has a contact engaging one end of the battery 42. Engaging the fittings 51 is a cap or cover 54 which is threaded thereto and which may be made of glass or transparent plastic as a housing for the lamp 52, so that the lamp forms a signaling device therewithin.

From the foregoing it will be apparent that when the knob 48 of the thimble is rotated, the thimble 30 by reason of its screw-threaded engagement with sleeve 32 will move longitudinally in the bore within the micrometer barrel, that is, the tool is used in the same manner as conventional micrometers. However, when the contact member 39 engages the work being measured, a circuit is completed through this member, the conductor 45, the spring 44, the battery 42, the lamp 52, and the spindle itself, and the frame of the micrometer back to the anvil 23. The lamp 52 is thus energized, giving the operator a signal that the work has been engaged. In this manner an electrical signal is given at the exact time that a feel is taken of the work. That is, the signal light comes on electrically when the work is engaged, and this feel can be accurately reproduced by unskilled operators.

As will be observed, the invention may be incorporated entirely as a modification of the spindle. Such modified spindle may be substituted for spindles in existing micrometers, or if desired, the modified spindle may be assembled with a thimble as shown in Fig. 2, and such assembly substituted for the corresponding assembly in existing micrometers.

As pointed out in the foregoing, the invention is not necessarily limited to micrometers, but its principle may be utilized in other similar types of tools such as inside calipers and the like. The foregoing disclosure is illustrative of a preferred form and manner of practicing the invention. The disclosure is illustrative of a preferred manner of embodying the invention in a micrometer spindle. It is to be understood that various modifications and departures may be adopted and practiced by those skilled in the art, which are within the scope and realm of the invention. It is intended that the disclosure be illustrative rather than limiting, the scope of the invention being as expressed in the claims annexed hereto.

We claim:

1. In a micrometer or the like, in combination: means forming a spindle for the micrometer having an insulated contact point at its end, said spindle having a central bore having a battery therein, means comprising an electric bulb carried by the spindle, and means forming an electrical circuit for energizing the bulb, the circuit being adapted to be energized upon engagement of the said contact point with work being measured, the said circuit being formed from the base of the bulb through the material of the spindle and the micrometer.

2. In a micrometer or the like, in combination: an adjustable spindle for the micrometer, means forming an insulated contact point at the end of the micrometer, the said spindle having a central bore having a battery and a spring therein, the said spindle having a fitting at one end having mounted therein an electric bulb electrically connected to said battery, and means forming an electrical circuit adapted to energize said bulb upon engagement of said contact point with work being measured, said circuit being formed in part directly by the material of the spindle and the micrometer frame.

3. In a micrometer or the like, in combination: an adjustable spindle for the micrometer, means comprising an insert forming an electrical contact in the end of the spindle, insulating means spacing the insert from the spindle, a battery and an electric bulb carried by the spindle, and means forming an electrical circuit for energizing the bulb, the circuit being adapted to be energized upon engagement of the contact point with work being measured, said circuit being formed in part directly by the material of the spindle and the micrometer.

4. In a micrometer or the like, in combination: means forming a spindle for the micrometer, means comprising an insert forming an electrical contact in the end of the spindle, insulating means spacing the insert from the spindle, the said spindle having a central bore having a battery therein and the spindle having a fitting at its end having therein an electric bulb, means forming an electrical connection from the said insert to the battery, and means adapted to complete an electrical circuit for energizing said bulb upon engagement of said contact with work being measured, said last means including the material of the said fitting, spindle and micrometer.

5. As an article of manufacture, a spindle for micrometers or the like, the said spindle having an insulated contact member at its end, and means comprising a battery and an electric bulb carried by the spindle having electrical connections and being adapted to have a circuit completed therethrough upon engagement of the contact member with work being measured, the circuit being completed through the base of the bulb, the material of the spindle and the micrometer.

6. As an article of manufacture, a spindle for micrometers or the like, the spindle having an insulated contact member at its end, the spindle having a central bore having a battery therein and a fitting at its end having an electric bulb therein, the contact member, battery and electric bulb being electrically connected and being adapted to have an electric circuit completed therethrough upon engagement of the contact member with work being measured, said circuit being formed in part directly by the material of the fitting, spindle, and micrometer.

7. As an article of manufacture, a spindle for micrometers or the like, said spindle having an insert at its end forming an electrical contact member, insulation forming a spacer between the contact member and the spindle, the said spindle having a central bore having a battery therein, means connecting the battery to said insert, a fitting carried by said spindle having therein an electric bulb connected to said battery, said fitting having a transparent enclosure for the bulb the spindle being adapted to have an electrical circuit completed through the contact member, battery and bulb upon engagement of the contact member with work being measured, the said circuit being formed in part directly through the material of the fitting, spindle, and micrometer.

8. As an article of manufacture, an assembly comprising a spindle and thimble for a micrometer or the like, the spindle having an insulated contact member at its end and having a central bore having a battery therein, the thimble being in engagement with the spindle at one end thereof and the spindle having a fitting at the end having an electric bulb therein, said fitting being arranged to attach the thimble to the spindle, electrically connected to the battery, the contact member, battery and bulb being adapted to have an electrical circuit completed therethrough upon engagement of the contact member with work being measured, said circuit being formed in part directly through the material of the fitting, spindle, and micrometer.

9. As an article of manufacture, a spindle and thimble assembly for a micrometer or the like, the spindle having an insulated contact member at one end, the thimble fitting detachably over one end of the spindle, the spindle having an extending nipple, and a fitting engaging said nipple and said thimble to attach them together and having within it an electrical signaling device connected to said contact member.

10. In a micrometer or the like, in combination: means forming a spindle for the micrometer having an insulated contact point at its end, means comprising an electric bulb and battery carried by the spindle, and means forming an electrical circuit for the bulb including a connection to said contact point, the remainder of the circuit being directly through the material of the spindle, the second means, and the micrometer.

11. In a micrometer or the like, in combination: means forming a spindle for the micrometer having an insulated contact point at its end, means comprising a fitting attached to the spindle having an electric bulb therein, a battery carried by the spindle, and means forming an electric circuit for the bulb comprising a connection to the contact point, the remainder of the circuit being directly through the fitting, spindle, and micrometer.

References Cited in the file of this patent

UNITED STATES PATENTS

| | | |
|---|---|---|
| 2,212,910 | Witchger | Aug. 27, 1940 |
| 2,217,509 | Bryant | Oct. 8, 1940 |
| 2,662,293 | Rutherford | Dec. 15, 1953 |